US007180880B2

(12) United States Patent
Imura (10) Patent No.: US 7,180,880 B2
(45) Date of Patent: Feb. 20, 2007

(54) TRANSMISSION POWER CONTROL METHOD AND APPARATUS

(75) Inventor: Minoru Imura, Tokyo (JP)

(73) Assignee: NEC Corporation, Tokyo (JP)

( * ) Notice: Subject to any disclaimer, the term of this patent is extended or adjusted under 35 U.S.C. 154(b) by 956 days.

(21) Appl. No.: 09/998,218

(22) Filed: Dec. 3, 2001

(65) Prior Publication Data

US 2002/0067702 A1    Jun. 6, 2002

(30) Foreign Application Priority Data

Dec. 5, 2000    (JP)    ............................. 2000-370607

(51) Int. Cl.
*H04B 7/216*    (2006.01)
(52) U.S. Cl. ...................... 370/335; 370/342; 370/328; 455/522
(58) Field of Classification Search ......... 370/310–350
See application file for complete search history.

(56) References Cited

U.S. PATENT DOCUMENTS

| 5,924,043 | A | 7/1999 | Takano | |
|---|---|---|---|---|
| 6,556,838 | B1 * | 4/2003 | Baker et al. ................. | 455/522 |
| 6,675,021 | B2 * | 1/2004 | Shiraki et al. ............... | 455/522 |

FOREIGN PATENT DOCUMENTS

EP    0 682 417 A2    11/1995

| WO | WO 00/04649 A1 | 1/2000 |
|---|---|---|
| WO | WO 00/33479 A1 | 6/2000 |

* cited by examiner

*Primary Examiner*—Seema S. Rao
*Assistant Examiner*—Michael J. Moore
(74) *Attorney, Agent, or Firm*—Foley & Lardner LLP (57) ABSTRACT

A transmission power control apparatus includes a transmission power control signal extracting section, transmission power control signal storage section, transmission power control determination section, and transmission power changing section. The transmission power control signal extracting section extracts a transmission power control signal from a reception signal containing a transmission power control signal. The transmission power control signal storage section sequentially stores transmission power control signals output from the transmission power control signal extracting section. The transmission power control determination section determines whether an instruction to increase/decrease transmission power based on a plurality of transmission power control signals stored in the transmission power control signal storage section is repeatedly generated. The transmission power changing section stops transmission power updating operation if the determination result from the transmission power control determination section indicates that the transmission power is repeatedly increased/decreased. A transmission power control method is also disclosed.

10 Claims, 6 Drawing Sheets

FIG. 6

TRANSMISSION POWER CONTROL METHOD AND APPARATUS

BACKGROUND OF THE INVENTION

The present invention relates to transmission power control on a mobile terminal and, more particularly, to a transmission power control method and apparatus used for a CDMA (Code Division Multiple Access) mobile terminal.

Transmission power control used for a conventional CDMA mobile terminal communication apparatus is performed by generating an instruction to increase/decrease transmission power by using a transmission power control bit sent from a base station for each slot. In a CDMA communication system, in order to provide stable communication, a base station must thoroughly control the transmission power of each mobile communication apparatus in accordance with the service to be provided and the like.

In the conventional CDMA communication system, however, the following problems are posed. First, transmission power control must be performed for each slot in accordance with a transmission power control bit updated for each slot, wastefully consuming power. Second, a transmission power control error in an apparatus under a relatively stable reception/transmission environment may affect the communication state of the system.

SUMMARY OF THE INVENTION

It is an object of the present invention to provide a transmission power control method and apparatus which suppress consumption of power.

It is another object of the present invention to provide a transmission power control method and apparatus which reduce the influence of a decoding error in a transmission power control bit on a system.

In order to achieve the above objects, according to the present invention, there is provided a transmission power control apparatus comprising extraction means for extracting a transmission power control signal from a reception signal containing a transmission power control signal, storage means for sequentially storing transmission power control signals output from the extraction means, first determination means for determining whether an instruction to increase/decrease transmission power based on a plurality of transmission power control signals stored in the storage means is repeatedly generated, and update stopping means for stopping transmission power updating operation if the determination result from the first determination means indicates that the transmission power is repeatedly increased/decreased.

DESCRIPTION OF THE PREFERRED EMBODIMENTS

The present invention will be described below in detail with reference to the accompanying drawings.

Figure 1:
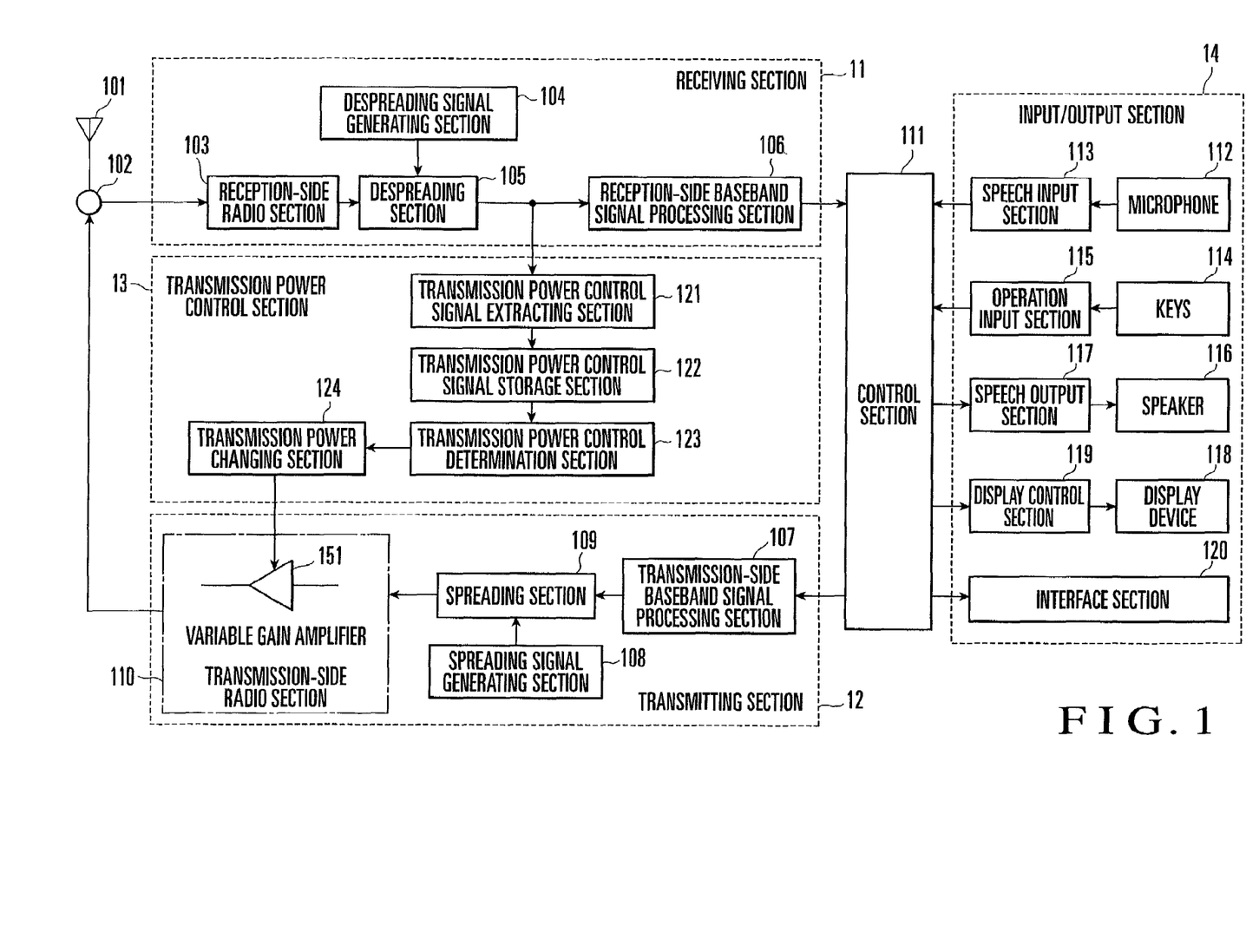
FIG. 1 is a block diagram showing a CDMA mobile terminal according to the first embodiment of the present invention.

FIG. 1 shows a CDMA mobile terminal according to the first embodiment of the present invention. The CDMA mobile terminal shown in FIG. 1 includes an antenna 101 for transmitting/receiving radio waves, a circulator 102 connected to the antenna 101, a receiving section 11 for receiving a signal through the antenna 101, a transmitting section 12 for transmitting a signal through the antenna 101, a transmission power control section 13 for controlling transmission power from the transmitting section 12 on the basis of a reception signal in the receiving section 11, an input/output section 14 for performing input/output operation with an operator, and a control section 111 for controlling the overall terminal. The circulator 102 supplies a reception wave from the antenna 101 to only the receiving section 11, and supplies a transmission wave from the transmitting section 12 to only the antenna 101.

The receiving section 11 includes a reception-side radio section 103 for obtaining a reception intermediate frequency signal from a reception signal obtained through the antenna 101, a despreading signal generating section 104 for generating a despreading signal identical or complex conjugate to a spreading signal on the transmission side, a despreading section 105 for extracting a baseband signal of a desired wave (to be referred to as a reception baseband signal hereinafter) by multiplying a reception intermediate frequency signal and a despreading signal from the despreading signal generating section 104, and a reception-side baseband signal processing section 106 for receiving a reception baseband signal from the despreading section 105 and performing predetermined processing for the signal.

The transmitting section 12 includes a transmission-side baseband signal processing section 107 for performing predetermined processing for a transmission baseband signal, a spreading signal generating section 108 for generating a spreading signal unique to each CDMA mobile terminal, a spreading section 109 for obtaining a transmission intermediate frequency signal by multiplying a transmission baseband signal from the transmission-side baseband signal processing section 107 and a spreading signal from the spreading signal generating section 108, and a transmission-side radio section 110 for generating a transmission wave from a transmission intermediate frequency signal from the spreading section 109.

The input/output section 14 includes a microphone 112 for receiving speech or the like, a speech input section 113 for processing a speech signal input from the microphone 112, a plurality of keys 114 for allowing an operator to input a telephone number, command, or the like, an operation input section 115 for processing a telephone number, command, or the like input from the keys 114, a speaker 116 for outputting speech, a speech output section 117 for processing a signal to be output to the speaker 116, a display device 118 for displaying characters and the like, a display control section 119 for processing characters and the like to be displayed on the display device 118, and an interface section 120 for interfacing with other devices.

The transmission power control section 13 includes a transmission power control signal extracting section 121, transmission power control signal storage section 122, transmission power control determination section 123, and transmission power changing section 124.

The transmission power control signal extracting section 121 extracts a transmission power control signal from a reception baseband signal from the despreading section 105. The base station determines, on the basis of the result obtained by measuring the base station reception level of the like of a signal sent from a CDMA mobile terminal, whether to increase or decrease the transmission power of the CDMA mobile terminal. The base station then inserts a transmission power control signal for instructing to increase/decrease the transmission power in a downstream signal. The transmission power control signal generally contains information instructing to increase or decrease transmission power by a specific dB.

The transmission power control signal is updated once for every one or five slots according to the specifications of a W-CDMA (Wideband-CDMA) system depending on the condition. When the signal is to be updated for every five slots, the same transmission power control signal may be repeatedly inserted in five slots. Alternatively, a valid transmission power control signal is inserted in only one slot, while invalid signals may be inserted in the four remaining slots. According to the specifications of the W-CDMA system, the period of one frame is 10 ms, and one frame is constituted by 15 slots. Therefore, the period of one slot is 0.625 ms. In addition, 64 frames constitute one superframe having a period of 64 ms.

The insertion period is an m-slot period, and one or two different periods are used in the system.

The transmission power control signal storage section 122 stores a predetermined number of transmission power control signals extracted by the transmission power control signal extracting section 121 in the FIFO (First-In First-Out) scheme. That is, upon reception of a new transmission power control signal from the transmission power control signal extracting section 121, the transmission power control signal storage section 122 erases the oldest transmission power control signal and stores the newest transmission power control signal.

The transmission power control determination section 123 determines, on the basis of a predetermined number of transmission power control signals stored in the transmission power control signal storage section 122, whether to control the transmission power. The transmission power control determination section 123 outputs a transmission power change instruction with a transmission power increase/decrease value to the transmission power changing section 124 only when determining that the transmission power should be controlled.

Upon reception of a transmission power change instruction from the transmission power control determination section 123, the transmission power changing section 124 controls a variable gain amplifier 151 of the transmission-side radio section 110 in order to change the transmission power by the transmission power increase/decrease value accompanying the transmission power change instruction.

Figure 2:
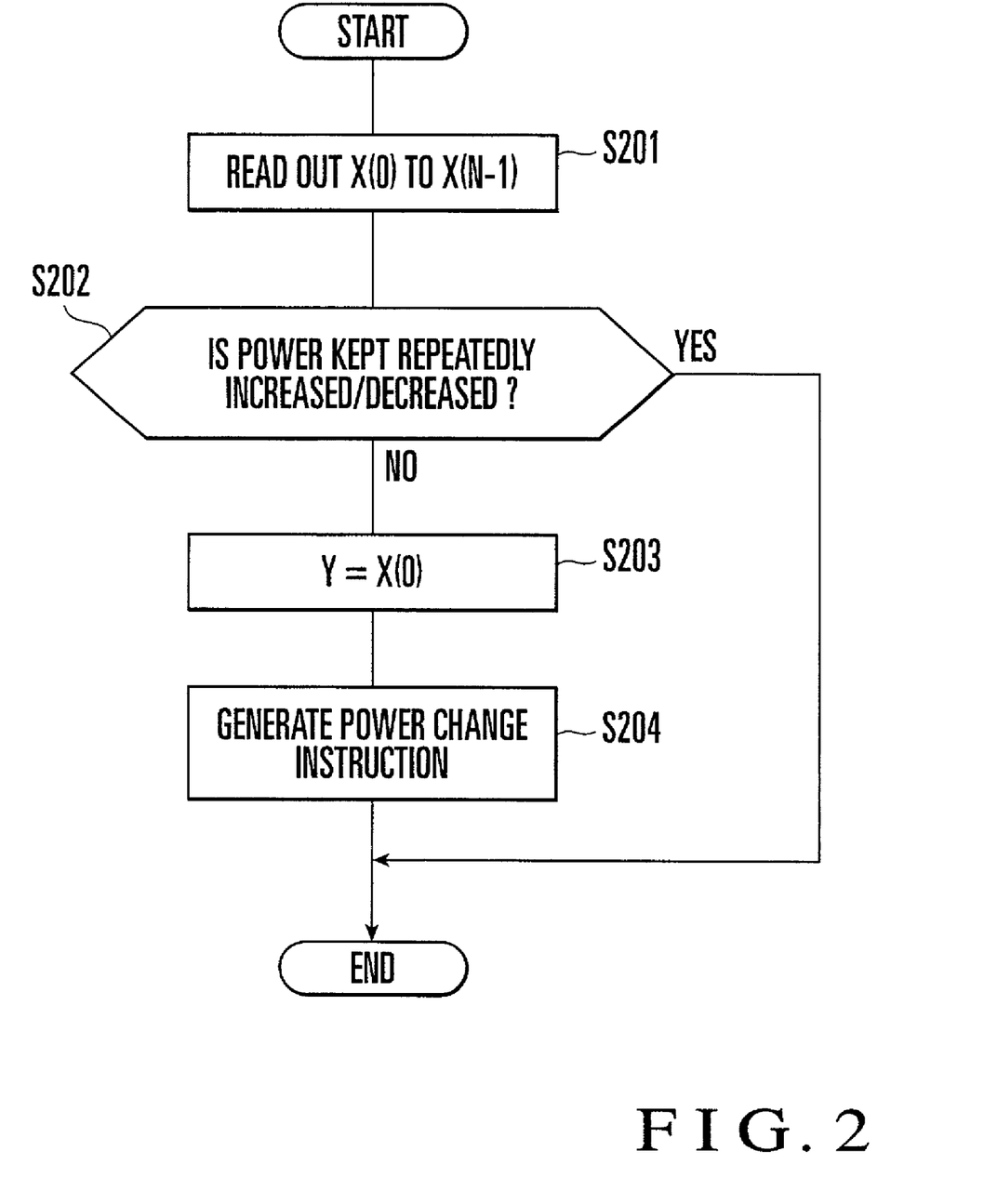
FIG. 2 is a flow chart showing the operation of the transmission power control determination section in FIG. 1.

The transmission power control operation of the transmission power control determination section 123 will be described next with reference to FIG. 2.

When a new transmission power control signal is stored in the transmission power control signal storage section 122, the transmission power control determination section 123 reads out N transmission power control signals $X(0)$ to $X(N-1)$ from the transmission power control signal storage section 122 (step S201). The signal $X(0)$ is the newest transmission power control signal, and the signal $X(N-1)$ is the oldest transmission power control signal.

The transmission power control determination section 123 checks the transmission power control signals $X(0)$ to $X(N-1)$ to determine whether the power is kept repeatedly increased/decreased (step S202). If "NO" in step S202, the transmission power control determination section 123 sets a transmission power increase/decrease value Y to an increase/decrease value $X(0)$ indicated by the newest transmission power control signal (step S203), and then outputs a transmission power change instruction with the transmission power increase/decrease value Y to the transmission power changing section 124 (step S204).

If "YES" in step S202, steps S203 and S204 are skipped. That is, the transmission power control section 13 does not update the transmission power by the newest transmission power control signal.

Figure 3:
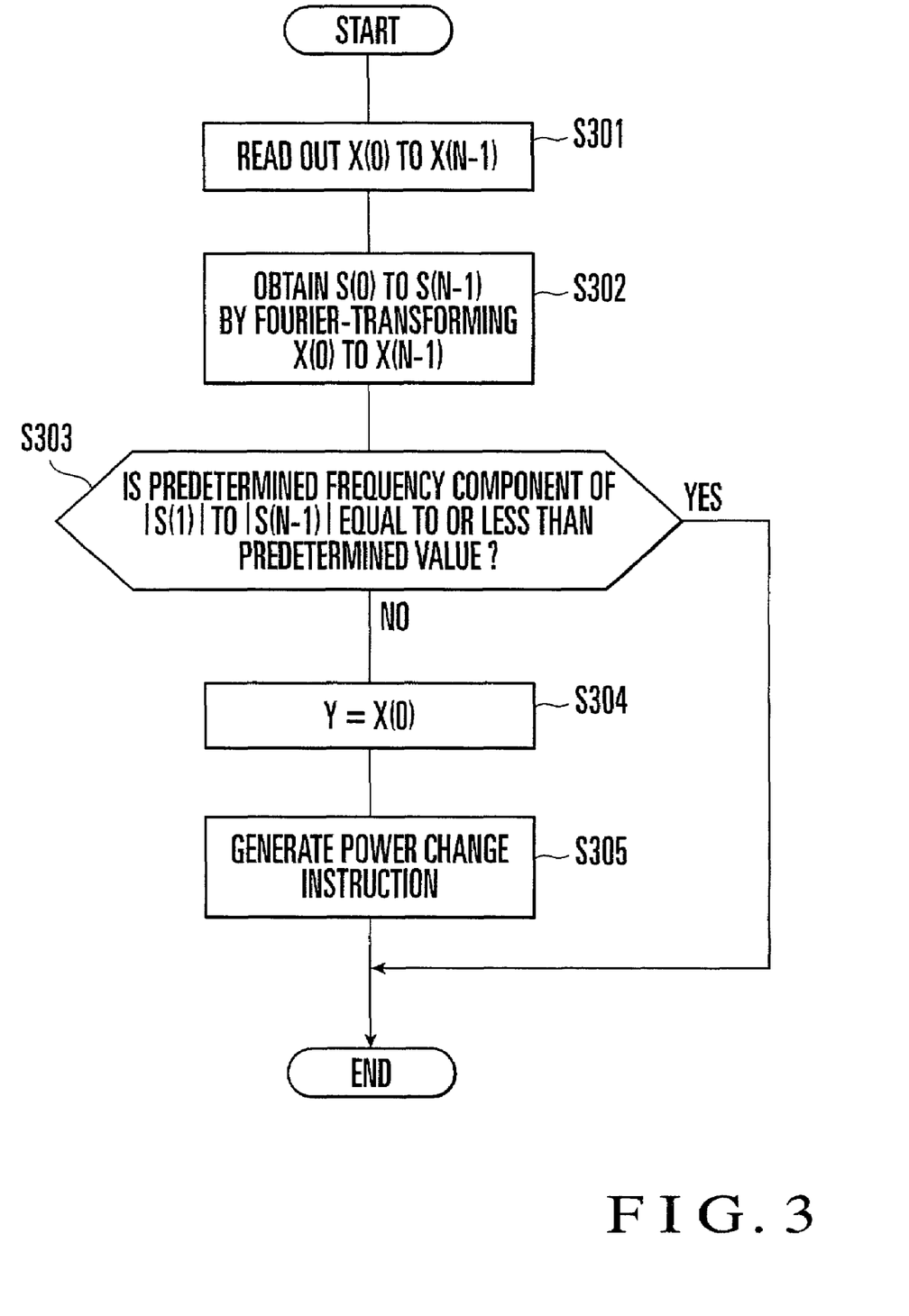
FIG. 3 is a flow chart showing the operation of the transmission power control determination section in FIG. 1 in detail.

A specific example of transmission power control operation will be described next with reference to FIG. 3.

When a new transmission power control signal is stored in the transmission power control signal storage section 122, the transmission power control determination section 123 reads out N transmission power control signals $X(0)$ to $X(N-1)$ from the transmission power control signal storage section 122 (step S301). The signal $X(0)$ is the newest transmission power control signal, and the signal $X(N-1)$ is the oldest transmission power control signal.

The transmission power control signals $X(0)$ to $X(N-1)$ are Fourier-transformed to obtain frequency components $S(0)$ to $S(N-1)$ (step S302). The component $S(0)$ is a DC component. The components $S(1)$ to $S(N-1)$ are AC components and represented by complex numbers.

The transmission power control determination section 123 checks whether a predetermined frequency component of frequency components $|S(1)|$ to $|S(N-1)|$ is equal to or less than a predetermined value (step S303). When a transmission power control signal is to be updated for every slot, the predetermined frequency component is $|S(1)|$. When a transmission power control signal is to be updated for every five slots and the same transmission power control signal is inserted in five slots, the predetermined frequency component is $|S(5)|$. When a transmission power control signal is updated for every five slots and the same transmission power control signal is to be inserted in every fifth slot, since the transmission power control signal extracting section 121 extracts a transmission power control signal in every fifth slot, the predetermined frequency component is $|S(1)|$.

If "NO" in step S303, the transmission power increase/decrease value Y is set to the increase/decrease value $X(0)$ indicated by the transmission power control signal (step S304), and a transmission power change instruction with the transmission power increase/decrease value Y is output to the transmission power changing section 124 (step S305).

If "YES" in step S303, the steps S304 and S305 are skipped. That is, the transmission power control determination section 123 and transmission power changing section 124 do not update the transmission power by using the newest transmission power control signal.

Figure 4:
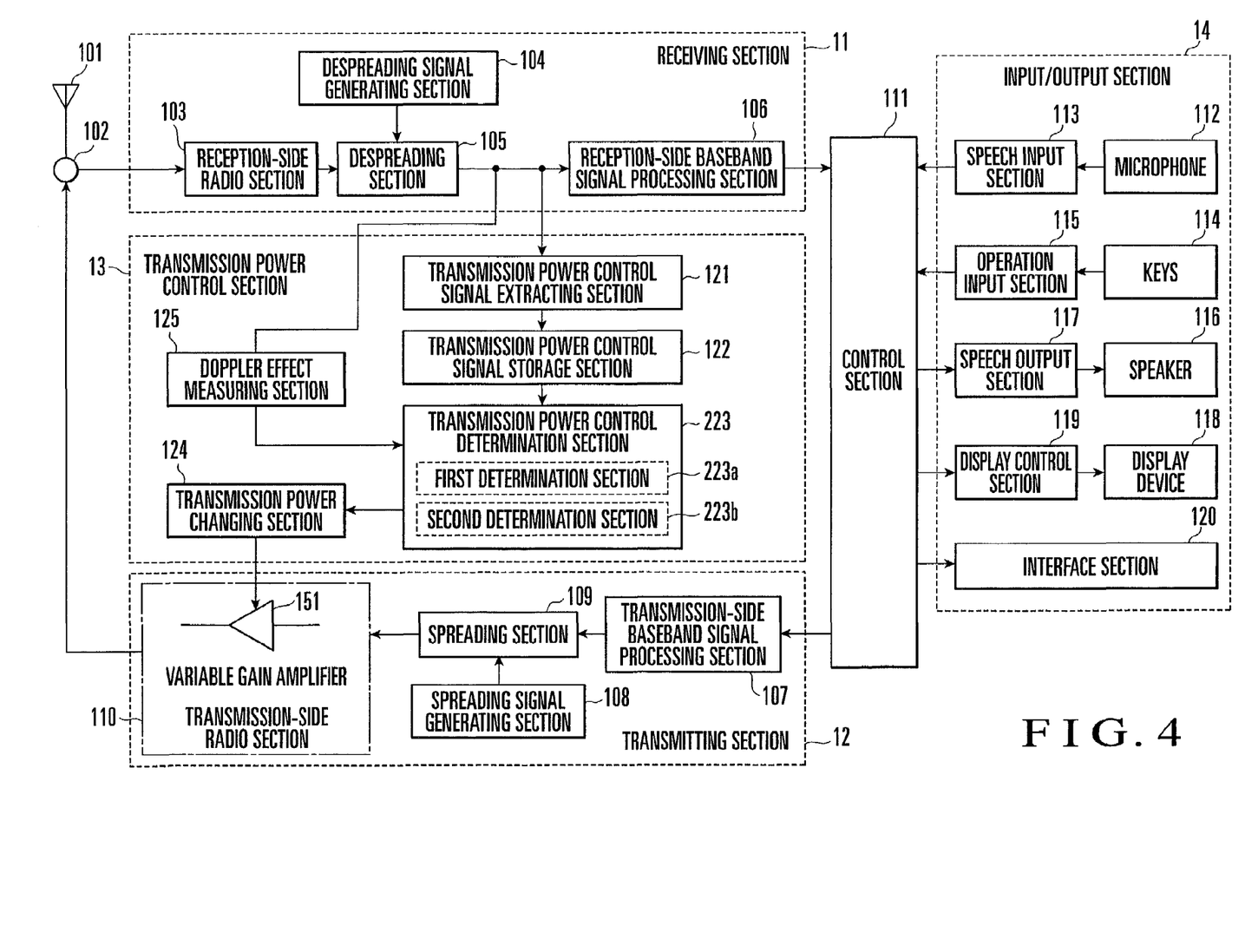
FIG. 4 is a block diagram showing a CDMA mobile terminal according to the second embodiment of the present invention.

FIG. 4 shows a CDMA mobile terminal according to the second embodiment of the present invention.

The CDMA mobile terminal of this embodiment differs from the CDMA mobile terminal of the first embodiment in that a Doppler effect measuring section 125 is added, and a transmission power control determination section 223 is used in place of the transmission power control determination section 123. The transmission power control determination section 223 includes a first determination section 223a having the same function as that of the transmission power control determination section 123 in FIG. 1, and a second determination section 223b having a determination function unique to the second embodiment. Other constituent elements are the same as those in the first embodiment, and hence a description thereof will be omitted.

The Doppler effect measuring section 125 compares the actual slot period of a reception baseband signal from a despreading section 105 with a reference slot period to measure a slot period deviation due to the Doppler effect on a reception wave which is produced when the CDMA mobile terminal moves, and outputs the deviation to the transmission power control determination section 223.

Figure 5:
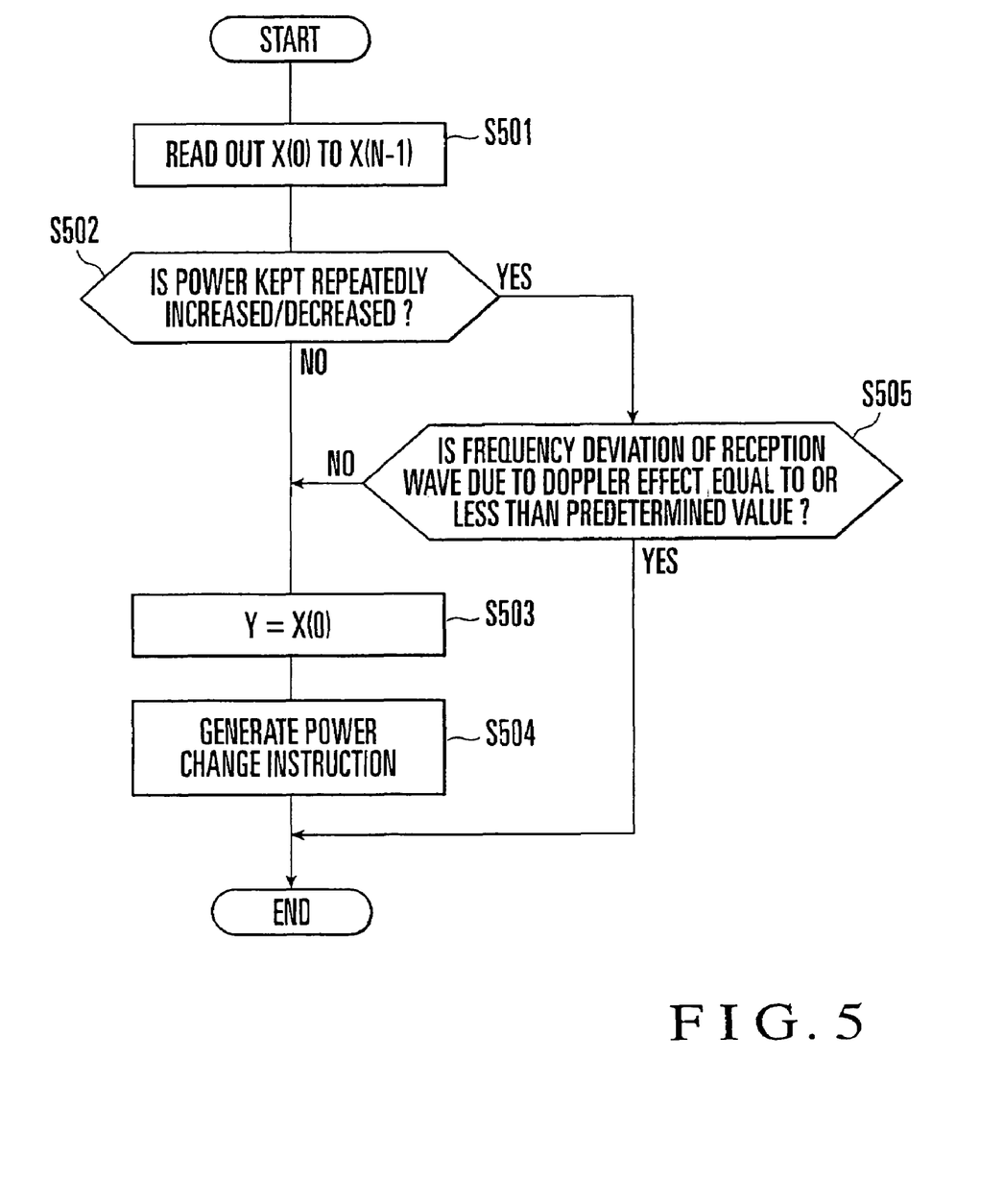
FIG. 5 is a flow chart showing the operation of a transmission power control determination section in FIG. 4.

The transmission power control operation of the transmission power control determination section 223 will be described next with reference to FIG. 5.

When a new transmission power control signal is stored in a transmission power control signal storage section 122, the transmission power control determination section 223 reads out N transmission power control signals X(0) to X(N−1) from the transmission power control signal storage section 122 (step S501). In this case, the signal (X0) is the newest transmission power control signal, and the signal X(N−1) is the oldest transmission power control signal.

By checking the transmission power control signals X(0) to X(N−1), the first determination section 223a of the transmission power control determination section 223 determines whether the power is kept repeatedly increased/decreased (step S502). If "NO" in step S202, the transmission power control determination section 223 sets a transmission power increase/decrease value Y to an increase/decrease value X(0) indicated by the newest transmission power control signal (step S503), and then outputs a transmission power control signal with the transmission power increase/decrease value Y to the transmission power changing section 124 (step S504).

If "YES" in step S502, the second determination section 223b of the transmission power control determination section 223 checks whether the frequency deviation of the reception wave due to the Doppler effect is equal to or less than a predetermined value (step S505). If "NO" in step S505, the flow advances to step S203. If "YES" in step S505, steps S203 and S204 are skipped.

Figure 6:
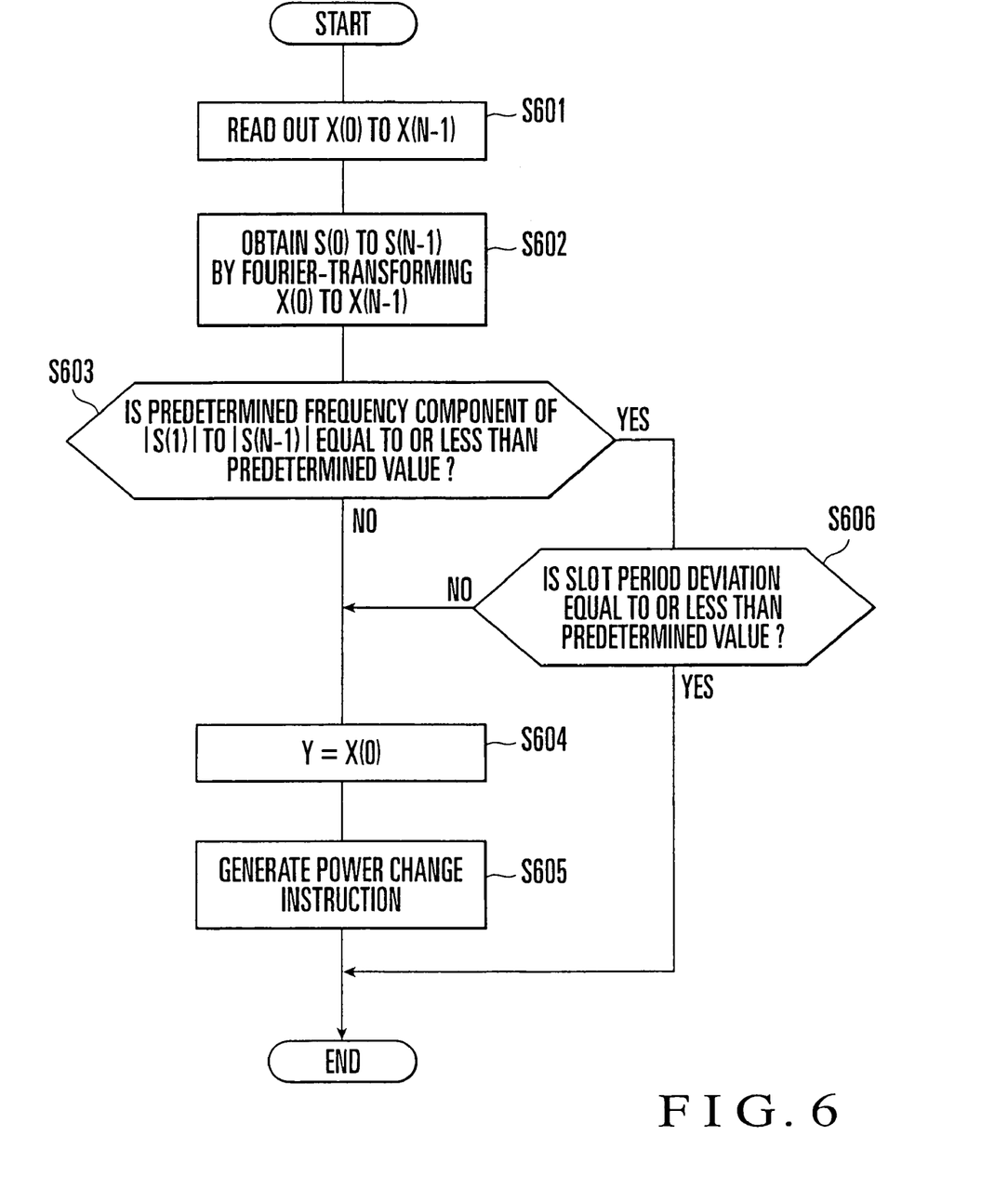
FIG. 6 is a flow chart showing the operation of the transmission power control determination section in FIG. 4 in detail.

A specific example of transmission power control operation will be described next with reference to FIG. 6. Steps S601 to S605 are the same as steps S301 to S305 in FIG. 3, and hence a description thereof will be omitted.

If "YES" in step S603, the second determination section 223b of the transmission power control determination section 223 checks whether the slot period deviation is equal to or less than a predetermined value (step S606). If "NO" in step S603, the flow advances to step S604. If "YES" in step S606, steps S604 and S605 are skipped.

As has been described above, according to the present invention, unnecessary transmission power changes can be omitted, and low power consumption and stable communication can be realized. In addition, the present invention can decrease the possibility of wrong transmission power control due to a decoding error in a transmission power control signal and determination error.

What is claimed is:

1. A transmission power control apparatus comprising:
  a transmission power control signal extracting section configured to extract a transmission power control signal from a reception signal;
  a transmission power control signal storage section configured to sequentially store a predetermined number of transmission power control signals extracted by the transmission power control extraction section;
  a first transmission power control determination section configured to check a sequential number of said transmission power control signals stored in said transmission power control section to determine whether an instruction to increase/decrease transmission power is repeatedly generated, wherein if said instruction to increase/decrease transmission power is not repeatedly generated, said first transmission power control determination section outputs a power change instruction with a transmission power increase/decrease value;
  a transmission power changing section configured to change transmission power in accordance with the power change instruction;
  a Doppler effect measuring section configured to compare a slot period of a reception signal with a reference slot period to measure a slot period deviation of a reception wave due to the Doppler effect; and
  a second transmission power control determination section configured to determine, if said instruction to increase/decrease transmission power is repeatedly generated, whether a deviation of a frequency of a reception wave due to the Doppler effect is equal to or less than a predetermined value, and permit said transmission power changing section to change transmission power if the deviation is greater than the predetermined value.

2. An apparatus according to claim 1, wherein said power control signal extraction section, power control signal storage section, first transmission power control determination section, and transmission power changing section are arranged in a CDMA (Code Division Multiple Access) mobile terminal.

3. An apparatus according to claim 1, wherein said power control signal extraction section, power control signal storage section, first transmission power control determination section, transmission power changing section, Doppler effect measuring section, and second transmission power control determination section are arranged in a CDMA (Code Division Multiple Access) mobile terminal.

4. An apparatus according to claim 3, wherein said Doppler effect is produced by movement of the terminal.

5. An apparatus according to claim 1, wherein said first determination means determines whether a predetermined frequency component of frequency components obtained by Fourier-transforming a plurality of transmission power control signals stored in said storage section is not more than a predetermined value.

6. A transmission power control method comprising the steps of:
  extracting a transmission power control signal from a reception signal;
  sequentially storing a predetermined number of transmission power control signals extracted in the extracting step;
  checking a sequential number of stored transmission power control signals to determine whether an instruction to increase/decrease transmission power is repeatedly generated;
  if said instruction to increase/decrease transmission power is not repeatedly generated, outputting a power change instruction with a transmission power increase/decrease value;
  comparing a slot period of a reception signal with a reference slot period to measure a slot period deviation of a reception wave due to the Doppler effect;

if said instruction to increase/decrease transmission power is repeatedly generated, determining whether a deviation of a frequency of a reception wave due to the Doppler effect is equal to or less than a predetermined value; and if said deviation of a frequency of a reception wave due to the Doppler effect is greater than a predetermined value and said instruction to increase/decrease transmission power is repeatedly generated, changing transmission power in accordance with the power change instruction.

7. A method according to claim 6, wherein said checking includes determining whether a predetermined frequency component of frequency components obtained by Fourier-transforming a plurality of stored transmission power control signals is not more than a predetermined value.

8. A method according to claim 6, wherein said extracting, sequentially storing, checking, outputting, and changing are performed by a CDMA (Code Division Multiple Access) mobile terminal.

9. A method according to claim 6, wherein said extracting, sequentially storing, checking, outputting, comparing, determining and changing are performed by a CDMA (Code Division Multiple Access) mobile terminal.

10. A method according to claim 9, wherein said Doppler effect is produced by movement of the terminal.

* * * * *